United States Patent
Bank et al.

[11] 3,937,414
[45] Feb. 10, 1976

[54] WIRE DOLLY

[76] Inventors: Morton L. Bank, 8 First St., Garden City, N.Y. 11530; Ronald J. Spieler, 90 Calla Ave., Floral Park, N.Y. 11001

[22] Filed: Nov. 25, 1974

[21] Appl. No.: 527,091

[52] U.S. Cl............ 242/86.5 R; 242/129; 280/47.19
[51] Int. Cl.². ........................................ B65H 75/40
[58] Field of Search.......... 280/47.19, 47.17, 47.35; 242/86.5 R, 129, 131

[56] References Cited
UNITED STATES PATENTS

| | | | |
|---|---|---|---|
| 875,476 | 12/1907 | Wasson | 242/86.5 |
| 1,054,919 | 3/1913 | Hoard | 242/86.5 R |
| 2,310,036 | 2/1943 | Owens | 242/86.5 R |
| 2,896,877 | 7/1959 | Vaughn | 242/86.5 |
| 2,965,327 | 12/1960 | Blary | 242/86.5 |
| 3,168,262 | 2/1965 | Germain | 242/129 |
| 3,178,129 | 4/1965 | Parkinson | 242/129 |
| 3,257,120 | 6/1966 | Browning | 280/47.17 |
| 3,464,647 | 9/1969 | Jacobi | 242/129 |

*Primary Examiner*—M. Henson Wood, Jr.
*Assistant Examiner*—John A. Pekar
*Attorney, Agent, or Firm*—Blum, Moscovitz, Friedman & Kaplan

[57] ABSTRACT

A dolly for carrying reels of wire to a construction site for on-site use thereof without removal thereof from the dolly is provided. A carriage bed is provided having a pair of wheels rotatably mounted on the underside of one end thereof, and a pair of supporting legs fixedly connected to the opposite end of the underside thereof. On the bed are a plurality of rotatably mounted turntables and the reel for a predetermined a gauge of wire may be releasably mounted on each turntable thereof. Each turntable includes a substantially centrally located upstanding spindle registrable with the axial channel provided in the wire wrapped reel. A supplementary spindle section may be releasably connected to each spindle upstanding on the turntable for carrying top-heavy reels or stacking reels one on the other. On the carriage bed at a predetermined location thereon, a wire guide may be connected for picking up slack in unreeled wire and for facilitating on-site simultaneous use of more than one wire. The carriage bed may include an accessory bin for storing tools and the like which may be used on-site in connection with an electrical installation. Fixedly connected to the underside of the carriage bed is a pair of spaced aligned collars and slidably mounted in the pair of collars is a telescoping handle for use in moving the dolly to the desired construction site.

10 Claims, 3 Drawing Figures

U.S. Patent  Feb. 10, 1976  3,937,414
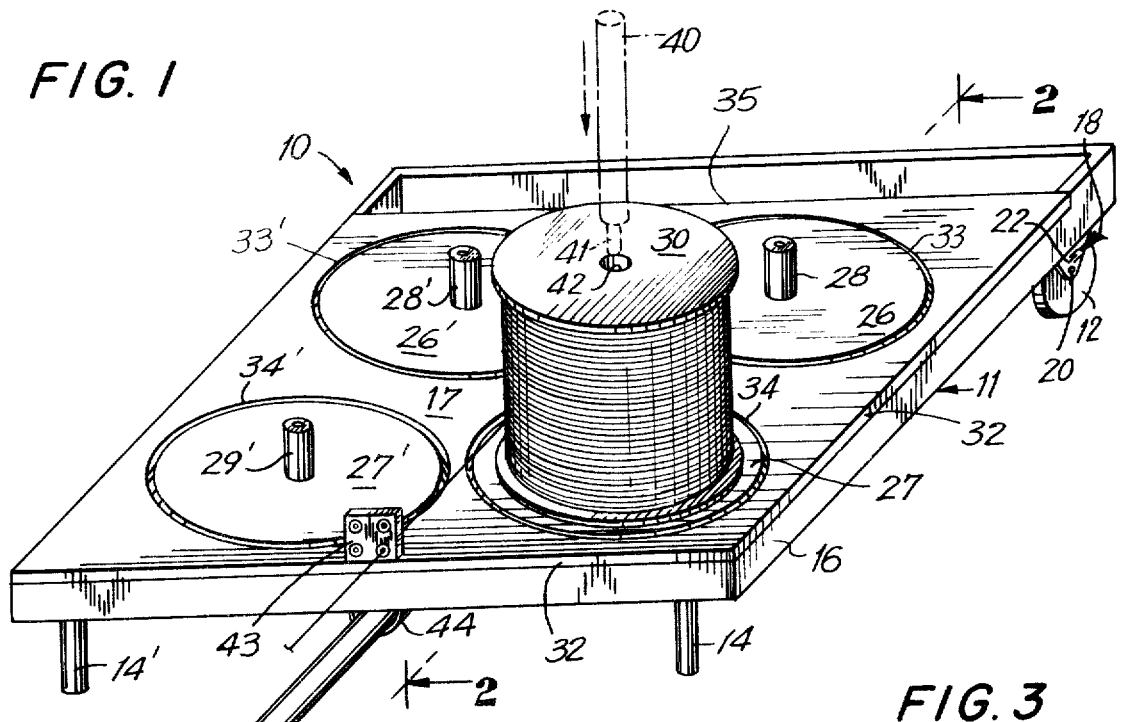
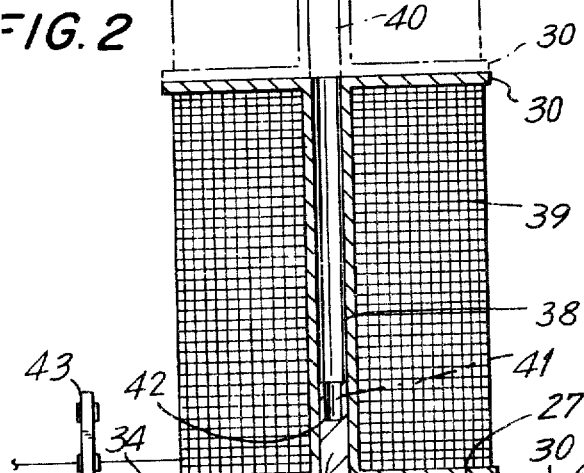
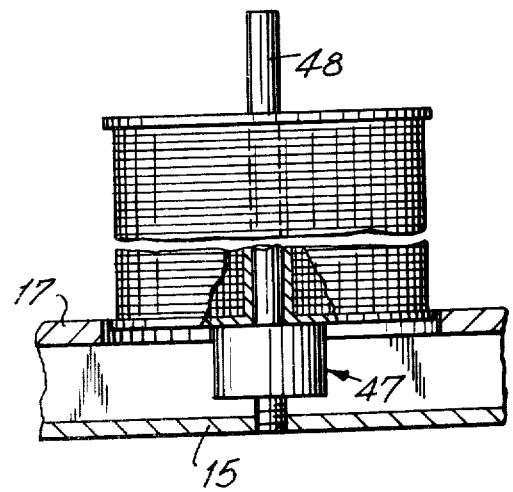
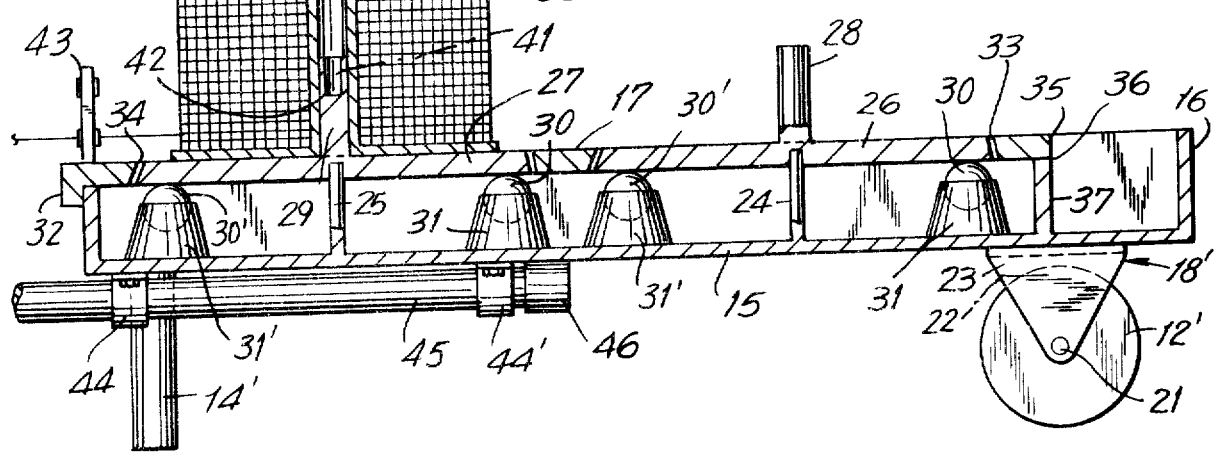

WIRE DOLLY

BACKGROUND OF THE INVENTION

This invention relates to a construction for a wire dolly, and more particularly to a dolly for carrying reels of wire to a construction site for on-site use thereof, without removal thereof from the dolly.

Electrical installations at construction sites usually require simultaneous input of plural gauged and color coded wire in various insulated conduits. The commercially available wire employed is conventionally supplied in bulk on spools. The length of these spools varies with the quantity and gauge of wire wrapped thereon, but the diameter thereof is generally constant.

For maximal efficiency and optimal job performance, efficient means for transporting wire, and empty spools thereof, to and from a work site must be provided. The wire transporter should preferably be compact, mobile over rough terrain, and light weight. For increasing on the job productivity, it is desirable that the spools of coiled wire be easily loaded on the transporter and payed out therefrom at the use site without fouling.

The instant invention therefore provides a novel wire dolly construction which includes all of these advantages. The wire dolly includes a compact, light weight, mobile carriage bed on which reels of coiled wire are releasably mounted and wire thereon may be payed out at the use site without fouling.

SUMMARY OF THE INVENTION

Generally speaking, in accordance with the invention, a dolly for carrying reels of wire to a construction site for on-site use thereof without removal thereof from the dolly is provided which includes a carriage bed having a pair of wheels rotatably mounted on the underside of one end thereof, and a pair of supporting legs fixedly connected to the opposite end of the underside thereof. On the bed are a plurality of rotatably mounted turntables and the reel for a predetermined gauge of wire may be releasably mounted on each turntable thereof. Each turntable includes a substantially centrally located upstanding spindle, registrable with the axial channel provided in the wire wrapped reel.

A supplementary spindle section may be releasably connected to each spindle upstanding on the turntable for carrying top-heavy reels or stacking reels one on the other. On the carriage bed at a predetermined location thereon, a wire guide may be connected for picking up slack in unreeled wire and for facilitating on-site simultaneous use of more than one wire.

The carriage bed may include an accessory bin for storing tools and the like which may be used on-site in connection with an electrical installation. Fixedly connected to the underside of the carriage bed is a pair of spaced aligned collars and slidably mounted in the pair of collars is a telescoping handle for use in moving the dolly to the desired construction site.

Accordingly, it is an object of this invention to provide a wire dolly having a novel construction.

Another object of the invention is to provide a wire dolly for transporting reels of coiled wire for on-site use thereof at electrical installations.

A further object of the invention is to provide a wire dolly which pays out wire loaded thereon, without fouling among plural wires payed out therefrom.

Still another object of the invention is to provide a novel wire dolly which is compact, light weight and mobile for facile accessibility into hatchways and crawl spaces found at installation sites.

Still other objects and advantages of the invention will in part be obvious and will in part be apparent from the specification.

The invention accordingly comprises the features of construction, combinations of elements, and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is an isometric perspective view of one dolly embodiment constructed in accordance with the instant invention;

FIG. 2 is a sectional view of the embodiment shown in FIG. 1, taken along line 2—2 thereof; and FIG. 3 is a fragmentary detail of an alternative construction for a turntable of the type employed on the dolly carriage bed for paying out coiled wire therefrom.

DETAILED DESCRIPTION OF THE INVENTION

Referring now to FIGS. 1 and 2, a dolly 10 constructed in accordance with the instant invention includes a carriage 11 having a pair of wheels 12 and 12' rotatably journalled in one end thereof, and a pair of upstanding legs 14 and 14' fixedly connected to the other end thereof. Carriage 11 includes a substantially rectilinear bed 15 provided with a continuous upturned peripheral flange 16 for removably mounting an overfitting cover plate 17 thereon.

To the underside of bed 15, a pair of substantially aligned braces 18 and 18' are fixedly connected. An axle 20, 21 is journalled in opposed downturned flanges 22, 23 of respective braces 18, 18' and wheels 12, 12' are respectively freely rotatably journalled thereon. In substantial alignment, one with the other, and with a respective wheel 12, 12' upstanding legs 14, 14' are fixedly connected to the underside of the opposite end of bed 15. Wheels 12 and 12' are ground engaging and bed 15 is thereby movable thereon. In an at rest position, bed 15 is substantially transversely positioned on wheels 12, 12' and leg supports 14, 14'. For moving bed 15, bed 15 is uplifted for disengaging legs 14, 14' from the ground.

Upstanding on the topside surface of bed 15 are bearing supports 24, 24', 25 and 25' having respective ends fixedly connected to bed 15 and opposed free ends on which respective turntables 26, 26', 27 and 27' are freely rotatably journalled. Concentric and upstanding on each turntable is a respective spindle 28, 28', 29 and 29' for removably mounting a plurality of wire wrapped spools 30 thereon. For stabilizing turntables 26, 26', 27 and 27' on their respective bearing supports and for facilitating rotation thereon, respective pairs of ball bearings 30, 30' are mounted on the topside surface of bed 15 in substantially frictionless casings 31, 31' whereby each respective pair thereof frictionally engages diametrically opposed underside ends of each respective turntable.

Overfitting cover plate 17 is provided with a complementary downturned peripheral flange 32 which marginally overlaps corresponding flange 16 of bed 15. Areas of cover plate 17 overlying the location of respective turntables 26, 26', 27 and 27' are apertured to accommodate the turntables. The number of apertures, of course, corresponds to the number of turntables rotatably mounted on bed 15. Each aperture 33, 33', 34 and 34' provided in cover plate 17 is substantially concentric relative to a corresponding bearing support 24, 24', 25 and 25' therefore. In each of the concentric apertures 33, 33', 34 and 34', a corresponding turntable 26, 26', 27 and 27' is rotatably registered. While it is necessary that a head space between the exterior perimeter of each turntable and the corresponding interior perimeter of each aperture therefore be provided for free rotation of the turntables, these head spaces are minimized so that wire unreeled from spools 30 does not fall therethrough.

Cover plate 17 is foreshortened relative to the length of carriage bed 15 for defining an accessory bin area in dolly 10. A rear transverse edge 35 of cover plate 17 overlies the top edge 36 of a substantially vertical standard 37 mounted rearwardly on the topside of carriage bed 15. As best seen in FIG. 2, a freely accessible storage bin area for tools and the like is therefore provided on bed 15 between standard 37 and the rearward transverse section of flange 16.

Spools 30 are of conventional construction and are provided with axial channels 38 therethrough which are correspondingly registrable on a spindle provided on the respective turntables 26, 26', 27 and 27', as best seen in FIG. 2. As thus mounted on the turntables, spools 30 are correspondingly rotatable therewith and a wire 39 of predetermined gauge and color code may be rotatably unreeled therefrom. To maintain spool 30 stable on the turntable, for instance turntable 27 as best seen in FIG. 2, against the tensile force exerted thereon by unreeling wire 39 therefrom, a supplementary spindle section 40 may be releasably mounted on the parent spindle 29. Additionally, supplementary spindle section 40 may be releasably mounted on the parent spindle for the purpose of providing a spindle mounting for a second spool 30 of coiled wire, the second spool 30 being aligned on the top of the first underlying spool. For the purpose of mounting supplementary spindle 40 on a parent spindle section, it is provided with a peg 41 extending from the downward end thereof and the corresponding parent spindle section, for instance spindle 29 is provided with an upwardly opening recess 42 in the top end thereof for receiving peg 41 whereby respective ends of the interface between spindle section 29 and supplementary spindle 40 are aligned.

An apertured guide member 43 is perpendicularly mounted at about the mid-point of the front end of cover plate 17. The apertures extend widthwise through guide member 43 and are in substantial parallel alignment. The number of apertures provided in guide member 43 substantially corresponds to the number of turntables provided in dolly 10. The free end of a coiled wire 39 is introduced through a discrete aperture provided in guide member 43 and wire rotatably unstrung from spool 30 is unreeled therethrough to the use site. The strand of wire from each spool in use is introduced into a corresponding aperture therefor in guide 43 so as to avoid tangling among wire strands which are simultaneously unstrung for installation, for instance in an electrical conduit. Additionally, it is found that the provision of an apertured guide member 43 for unreeling the wire strands prevents back lash of wire on the spool thereof which may ordinarily occur by the application of uneven pressure for unreeling the coiled wire.

Aligned and mounted on the underside of bed 15 are a pair of collars 44 and 44'. Collars 44 and 44' are substantially located along the line provided by a plane bisecting dolly 10 lengthwise. Both collars are in spaced relationship relative to each other for supporting telescoping handle 45 which is slidably connected in respective collars 44, 44'. The rearward end 46 of the telescoping handle is expanded for determining the distance which handle 45 telescopes forwardly in respective collars 44, 44'. Expanded end 46 is provided with a diameter which abuts collar 44' without passing therethrough. In a period of non-use, handle 45 may be telescoped rearwardly for substantially underlying bed 15. For manually transporting dolly 10 to a use site, handle 45 may be telescoped forwardly until expanded end 46 thereof abuts collar 44'.

Referring now to FIG. 3, an alternative means for rotatably unwinding coiled wire 39 from spool 30 is shown. Instead of the turntable-bearing support assembly as seen in FIGS. 1 and 2, a bearing pile 47 is mounted on the topside surface of bed 15 in substantially concentric relationship with the corresponding aperture, for instance aperture 34, provided in cover plate 17. A spindle 48 is rotatably journalled in bearing pile 47, and spool 30 may be mounted thereon.

The size of the dolly may, of course, be adjusted according to the number of rotatable spool mountings provided therein. While apparent, it is observed that legs 14, 14' may be replaced by a second pair of wheels, however, if that modification is made, it is desirable to provide the dolly with a wheel brake for stabilizing the position thereof, as desired. While apertured guide member 43 substantially prevents back lash of wire on to the spool, it is also within the scope of the invention to provide each spool with a drag brake to further assure that a back lash does not occur and for assuring that wire 39 is not inadvertently unreeled from its spool. Other modifications within the scope of the invention, may occur to the art-skilled.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A dolly for carrying spools of wire to a construction site for on-site use thereof without removal thereof from the dolly comprises a carriage including a carriage bed, at least one turntable rotatably mounted on said carriage bed, means for releasably mounting a spool of coiled wire on said at least one turntable, an overfitted cover plate releasably overlying said carriage bed, said overfitted cover plate having at least one aperture therein in which said at least one turntable is registered, said overfitted cover plate being foreshortened relative to the length of said carriage, and an accessory bin being defined between said foreshortened end of said overfitted cover plate and a corresponding end of said carriage for storing installation equipment and the like.

2. The dolly as claimed in claim 1 including handle means for moving said carriage.

3. The dolly as claimed in claim 2 wherein said handle means comprises a handle bar telescopable under said carriage bed, a pair of aligned collars in spaced relationship relative to each other being fixedly connected to said carriage for supporting said handle bar, said handle bar being slidably connected to said collars.

4. The dolly as claimed in claim 1 wherein said carriage includes a pair of ground engaging wheels in spaced relationship relative to each other, said pair of wheels being rotatably journalled in one end of said carriage.

5. The dolly as claimed in claim 1 wherein said carriage includes a pair of upstanding legs in spaced relationship relative to each other, said legs being fixedly connected to an end of said carriage.

6. The dolly as claimed in claim 1 wherein said mounting for said at least one turntable comprises a bearing support having an end fixedly connected to said carriage bed and another free end on which said at least one turntable is rotatably journalled.

7. The dolly as claimed in claim 1 wherein said at least one turntable comprises a bearing surface of a bearing pile mounted in said carriage bed.

8. The dolly as claimed in claim 1 wherein said means for releasably mounting said spool of coiled wire on said at least one turntable comprises a spindle section being registrable in a central axial channel provided in a conventional spool.

9. The dolly as claimed in claim 8 including a supplementary spindle section releasably connectable to said spindle section provided on said turntable.

10. The dolly as claimed in claim 1 including an apertured wire guide member perpendicularly mounted on said overfitted cover plate, a free end of wire coiled on said spool being threaded through an aperture thereof for thereby guiding the release of wire from said spool.

* * * * *